(12) United States Patent
Kelton et al.

(10) Patent No.: US 6,254,462 B1
(45) Date of Patent: *Jul. 3, 2001

(54) APPARATUS AND METHOD FOR CLEANING AND RESTORING FLOOR SURFACES

(75) Inventors: Shane M. Kelton, May, TX (US); Tina O. Outlaw, Inver Grove Heights; Terry J. Klos, Victoria, both of MN (US)

(73) Assignee: Ecolab Inc., St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/021,106

(22) Filed: Feb. 10, 1998

Related U.S. Application Data (63) Continuation-in-part of application No. 08/382,906, filed on Feb. 3, 1995, now Pat. No. 5,716,260.

(51) Int. Cl.[7] .................................................. B24C 9/00
(52) U.S. Cl. .............................. 451/87; 451/88; 451/92; 451/350
(58) Field of Search .............................. 451/87, 88, 92, 451/350

(56) References Cited

U.S. PATENT DOCUMENTS

| | | | |
|---|---|---|---|
| 2,770,924 | * | 11/1956 | Mead et al. . |
| 3,768,210 | * | 10/1973 | Johnson et al. ........................ 51/12 |
| 3,847,688 | * | 11/1974 | Gillice . |
| 3,925,935 | * | 12/1975 | Ricklefs . |
| 4,295,274 | * | 10/1981 | Bricher et al. . |
| 4,377,923 | * | 3/1983 | Bergh ..................................... 51/424 |
| 4,433,511 | * | 2/1984 | Swain ..................................... 51/424 |
| 4,470,226 | * | 9/1984 | Williams . |

(List continued on next page.)

FOREIGN PATENT DOCUMENTS

| | | | |
|---|---|---|---|
| 0 416 711 A1 | * | 3/1991 | (EP) . |
| 617 161 | * | 2/1949 | (GB) . |
| 2 193 454A | * | 2/1988 | (GB) . |
| 89/07484 | * | 8/1989 | (WO) . |
| 0 349 490 | * | 1/1990 | (WO) . |
| 92/07889 | * | 5/1992 | (WO) . |
| 92/17317 | * | 10/1992 | (WO) . |

OTHER PUBLICATIONS

Ellis J. Griffin; Affidavit Regarding Public Use; Mar. 3, 1995; pp. 1–3.*
Economics in Technology/Carroll Company; "Ultra–Traxion" promotional flyer and label; undated.*
American Marazzi Tile; "Technical Information"; undated; pp. 2 and 3.*
Welding and Metal Fabrication, 20 (1952.10), 10, 362, Vacu–Blasting.*

*Primary Examiner*—Timothy V. Eley
*Assistant Examiner*—Dung Van Nguyen
(74) *Attorney, Agent, or Firm*—Merchant & Gould P.C.

(57) ABSTRACT

A cleaning and restoration system 10 for floors 11 and other hard surfaces is disclosed. The system 10 has an cleaning head 12 which can be moved across a floor 11 or other hard surface. The cleaning head 12 impinges particulate media upon the floor 11 to remove soils and provide a slip-resistant surface. The media is entrained into the air by a pressure tank 17 which includes a classifier 18 for reclaiming a portion of the media for reuse. The pressure tank 17 has a series of dispersion bars 68 for separating the heavy particles to be re-used. The dust, soils, and other undesirable materials are filtered in a dust collector 57 having a cyclonic filter 71. A compressor 20, a vacuum/blower 22, and other components of the system are mounted on a truck 19. A method for utilizing the restoration system 10 is also disclosed.

28 Claims, 8 Drawing Sheets

U.S. PATENT DOCUMENTS

| | | | |
|---|---|---|---|
| 4,592,108 | * | 6/1986 | Svendsen . |
| 4,646,482 | * | 3/1987 | Chitjian .................................. 51/424 |
| 4,671,022 | * | 6/1987 | Williams . |
| 4,768,311 | * | 9/1988 | Olson . |
| 4,822,431 | * | 4/1989 | Bricher et al. . |
| 4,941,296 | * | 7/1990 | Carpenter ............................... 51/443 |
| 5,054,245 | * | 10/1991 | Coty . |
| 5,695,389 | * | 12/1997 | Bartel et al. .......................... 451/92 |

* cited by examiner

APPARATUS AND METHOD FOR CLEANING AND RESTORING FLOOR SURFACES

This patent application is a continuation-in-part of U.S. Ser. No. 08/382,906, filed Feb. 3, 1995, now U.S. Pat. No. 5,716,260.

FIELD OF THE INVENTION

This invention relates generally to systems for cleaning and restoring hard surfaces such as floors. The invention is particularly useful for maintaining a clean and slip-resistant surface on quarry tile floors.

BACKGROUND OF THE INVENTION

Extruded clay or ceramic tile, sometimes called quarry tile, is used in restaurant kitchens. Quarry tile is popular in restaurants and other kitchen areas because it is relatively inexpensive, durable, and has relatively low porosity. Quarry tile is made from natural clays with the composition being approximately 50% hard particles (silicon) and 50% soft particles (clay components). When the clay tile is fired, it develops a pervious glaze-like coating which encapsulates pores under the surface. Because of the pervious nature of the surface, these pores collect and entrap various soils that are extremely difficult to clean thoroughly.

The surface of the tile is subject to wear, polishing and soil build-up which can result in a slippery floor condition. Slippery floors result in accidents and injuries from slipping and falling. These accidents can cause a serious injury to the restaurant worker, and they result in significant costs for the restaurant owner.

One of every twenty workplace injuries in the United States occurs in a restaurant. The U.S. Food Service Industry spends approximately four hundred million dollars per year on slips and falls. Approximately half of that amount is spent on re-training and time lost, and the other half is spent on medical, worker's compensation, and overtime expenses. Many other accidents occur in hotels, homes, places of business, hospitals, and around swimming pools, due to slipping on wet surfaces of ceramic tile, glazed porcelain and smooth concrete.

During the manufacturing process of quarry tile, a natural surface roughness is created consisting of hard, microscopic peaks of silica and inert clays. The surface texture or roughness coupled with the surface porosity provides the tile with an optimum static coefficient of friction (traction). New quarry tile tends to be slip-resistant, and some tiles feature anti-slip properties such as added grit, grid patterns or a rougher surface texture. However, even the anti-slip tiles become worn, soiled, and slippery over time. After a short time, the quarry tile is subjected to abrasion and surface wear due to foot traffic, soils and daily surface cleaning. The original hard microscopic peaks become polished or worn down, leading to flat surface areas. These worn areas result in a lower static coefficient of friction and create a potentially slippery floor surface. In addition, frying, grilling and sauteing create airborne grease, which causes a potentially hazardous film to develop on kitchen floors. The grease gets carried by shoes to other parts of the restaurant. This layer of grease can be enough to cause an accident. If poorly cleaned, a quarry tile floor can become saturated with grease, and may continue to stay slippery despite routine cleaning.

To address this slipperiness problem, several techniques have been utilized. One technique is the application of an acid etchant to the surface of the floor. An example of this process is the Gillice patent, U.S. Pat. No. 3,847,688. The acid etch system works by dissolving silicon and creating microscopic pores in the tile. While the acid etchant reduces floor slipperiness on a temporary basis, it is not effective over the long-term. After use of the acid etch technique, the microscopic pores become filled with grease and other types of soil, thereby resulting in a slippery floor condition. Additionally, the acid etch process destroys the hard components of the clay tiles (the silicon), leaving softer components of the floor at the surface. These softer components are easily worn away, which can result in a worn and/or uneven floor surface. In effect, the acid etch technique destroys the tile. In addition, the acid poses a potential safety hazard if it is not utilized properly. For a variety of reasons, some manufacturers of tile do not recommend the use of any acid cleaning on their ceramic tile products.

Other solutions to the slipperiness problem have been to lay non-slip mats upon the floor, and to apply abrasive strips to the floor. However, these mats and strips become worn rather quickly, and they hinder the daily routine cleaning of the floor. The mats sometimes come loose and slide, and they significantly alter the appearance of the floor surface. It is also is difficult to clean and sanitize the mats.

Another attempt at solving the slipperiness problem is a diamond etch technique. With the diamond etch system, a diamond cutter may be utilized to create concentric circles in the floor. The circles are approximately ⅛ to ¼ inch in depth, which unfortunately create circular cracks for soil buildup. These circles, along with the tile's grout areas, are especially difficult to clean. It is also possible to apply a slip resistant coating to floors. These coatings can be difficult to apply, and soil can adhere to the coating.

Although sandblasting systems are known in the prior art, the typical sandblasting systems can ruin some floors and produce too much dust for indoor use. For example, the Ricklefs patent (U.S. Pat. No. 3,925,935) discloses a system for abrading the surface of a porcelain bathtub to render it slip resistant. With this system, the bottom of the tub is covered with a stencil, a cover is draped over the tub, and a stream of abrasive granules is applied to the bottom of the tub at the stencil. However, there is no teaching or disclosure in the Ricklefs patent regarding the utilization of a system for cleaning and restoring floor surfaces.

Another attempt found in the prior art is described in the Mead patent, U.S. Pat. No. 2,770,924. This patent discloses a blasting device for cleaning and treating surfaces such as wood, glass, metal, cement, or a synthetic. In addition, British Patent No. 2193454A describes a system for projecting glass beads, grit or sand onto a surface to be cleaned. With this system, the compressor and the storage container for the grit are mounted upon a truck.

The present invention addresses the problems associated with currently available cleaning techniques.

SUMMARY OF THE INVENTION

The invention is a closed mechanical system for moving a fluidized stream of particles through a carrying medium (air, for example) onto the target surface, such as a floor. The stream of particles impacts the hard surface, so as to physically remove soils and surface materials. The particles are instantly vacuumed and recovered from the point of impact.

The system for cleaning and restoring the slip resistance of a floor comprises several elements: a compressor for supplying an air stream through an air supply conduit;

moisture reduction means for removing excess moisture from the air stream; entrainment means for entraining particulate media into the air stream; a media chamber for storing the particulates before entrainment; abrasion means for impinging the particulates upon the floor for removal of soils and surface particles; a vacuum means which evacuates soils and surface particles from the floor; a classifier for separating the reusable particulate media from the soils; and a filter means for filtering and collecting the soils for disposal. In the preferred embodiment, the system has two unique media transfer systems: 1) for automatically transferring the reclaimed particulate media from the classifier and into a pressure tank for re-use, and 2) for automatically transferring virgin media from a storage hopper to the pressure tank.

Another aspect of the invention is a method for cleaning and restoring a hard surface. This method includes the steps of: positioning a vehicle proximate the site of the hard surface to be restored, with the vehicle containing a compressor, a vacuum/blower, a pressure tank containing particulate media, and a dust collector; entraining the particulate media into the air stream; adjusting the amount of particulate media to be entrained; and passing the cleaning head over the surface to be treated. The inventive method also includes the steps of adjusting the pressure at which the media is applied, and adjusting the amount of particulate media which is designated for re-use.

A final aspect of the present invention is a tile floor surface which has been treated with the restoration system of the present invention. The tile floor surface as a certain preferred chemical composition, and a referred coefficient of friction.

A primary advantage of the present invention is that it restores the traction of the tile to a condition that is equal to or better than new tile, as measured by the coefficient of friction. By increasing the coefficient of friction and reducing floor slipperiness, dangerous and costly accidents can be avoided. The present invention results in a relatively non-slippery floor surface, even when the floor becomes soiled or wet. The slip resistance is achieved primarily by the mechanical removal of more of the softer components of the tile, while leaving a substantial amount of the hard components of the tile in place. This type of mechanical action preserves the overall integrity of the tile, unlike acid etch treatments.

Another advantage of the present invention is that it provides a deep and thorough cleaning of the floor tile. Despite daily cleansing of the floor, soil and grease often build up over time. The present invention effectively impacts, loosens, and removes the soil buildup, thereby resulting in a sanitary, attractive floor surface.

Yet another advantage of the present invention is that it may be utilized on a wide variety of surfaces, and it may be utilized either indoors or outdoors. For example, the present invention may be utilized on concrete (pool decks, buildings, roadways, walkways, etc.); stainless steel (hood and ducts, etc.); asphalt (driveways, roads, etc.); and other surfaces and applications. Because the invention incorporates a closed mechanical system in which the fluidized stream of particles is contained, the invention may be utilized both indoors and outdoors.

A further advantage of the present invention is that the floor maintains its slip resistance over the long term, assuming that normal floor maintenance is performed. Specifically, a tile floor may be able to maintain its slip resistance for one to three years after use of the present invention. After treatment of the floor with the inventive system, routine cleaning with a deck brush is more effective at removing grease and other soils. The restoration system can also decrease the drying time of the floor surface by restoring the floor's natural porosity.

The present invention is also advantageous because it is relatively easy to use. The equipment is relatively compact, lightweight and portable, so that it can be easily moved from location to location. All components of the system can be mounted on a truck, trailer or other portable vehicle; or the system can be maintained as a permanent installation near the desired place of use. The machine's cleaning head covers a relatively wide path, and the treatment can be applied uniformly over the floor's surface. Additionally, the present invention effectively filters dust through use of a unique filtering and vacuum system. The design of the present invention provides for the effective flow of the media without problems due to clogging and excess moisture.

Yet another advantage of the present invention is that the optimum media can be selected for use, depending upon the type of floor surface, the type of soil, the amount of cleaning and/or traction to be achieved, and other particular conditions of the situation. Additionally, the proper particle size, pressure and flow rate of the media may be selected and adjusted to achieve the best results.

Another advantage of the present invention is that the media flow is greatly improved by the drying chamber of the present invention. This reduces problems with clogging, which means that the system has less "down" time.

For a better understanding of the invention and the advantages obtained by its use, reference should be made to the drawings and the accompanying descriptive matter, in which there is illustrated and described a preferred embodiment of the invention.

DETAILED DESCRIPTION OF THE PREFERRED EMBODIMENT

Figure 1:
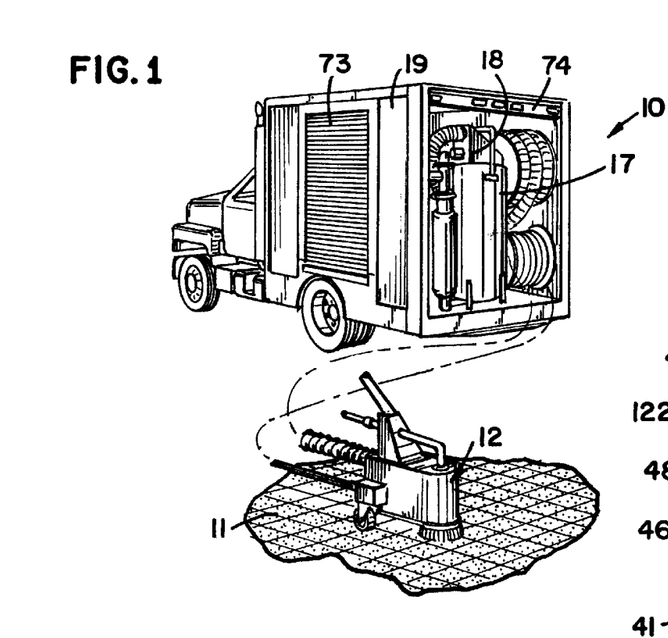
FIG. 1 is a perspective view of the floor restoration system of the present invention.

FIG. 1 illustrates the cleaning and restoration system 10 of the present invention. The system 10 includes a cleaning head 12 which is movable across the surface 11 to be treated. FIG. 1 shows the cleaning head 12 removed from the truck 19. The cleaning head 12 impinges a high-velocity fluidized stream of abrasive particles (not shown) against the surface 11 to be abraded. The system 10 includes a blast tank 58, which is divided into two chambers: a pressure tank 17 and a classifier 18. In the classifier 18, the material which is returned from the floor is separated into dust (which is disposed of) and clean media (which is reused).

Figure 10:
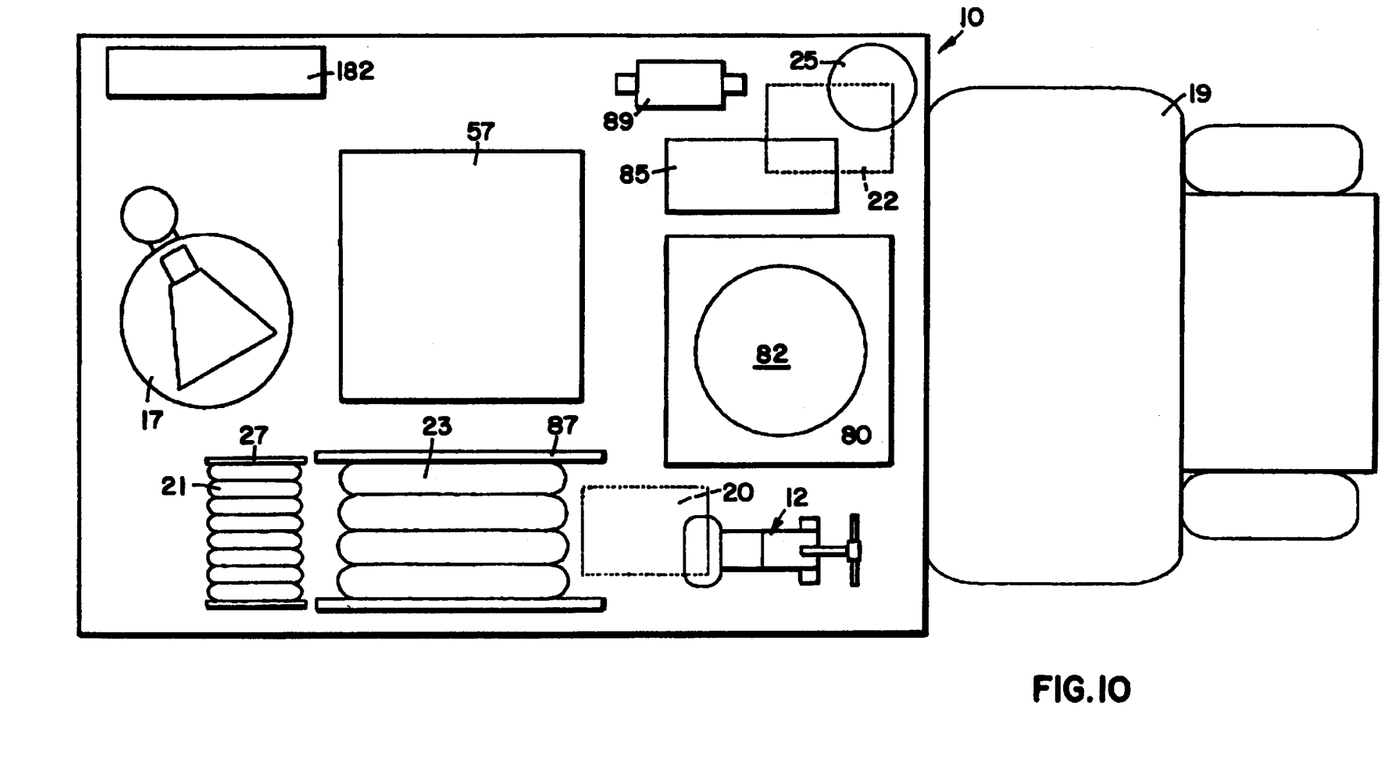
FIG. 10 is a top plan view of the truck and system components.

The system 10 is designed so that all of its components can be mounted within a truck 19 or other type of vehicle for portability, as shown in FIG. 10. Alternatively, the system components may be stationary, so that the surfaces to be treated (e.g. pots or storage tanks) would be brought to the site of the restoration apparatus. FIG. 10 shows a preferred embodiment of the system, with each of the components being positioned in the trailer of the truck 19. With this truck-mounted system 10, the media is automatically transferred into the blast tank 58, and the blast tank 58 remains on the truck 19 during operation. The truck bed has a rear door 74 and a pair of side doors 73 for access to various components of the system.

As an alternative, the blast tank 58 could be removable from the truck 19, and mounted on a cart (not shown). With this mobile embodiment, the media is poured into an opening in the blast tank 58 manually.

Figure 2:
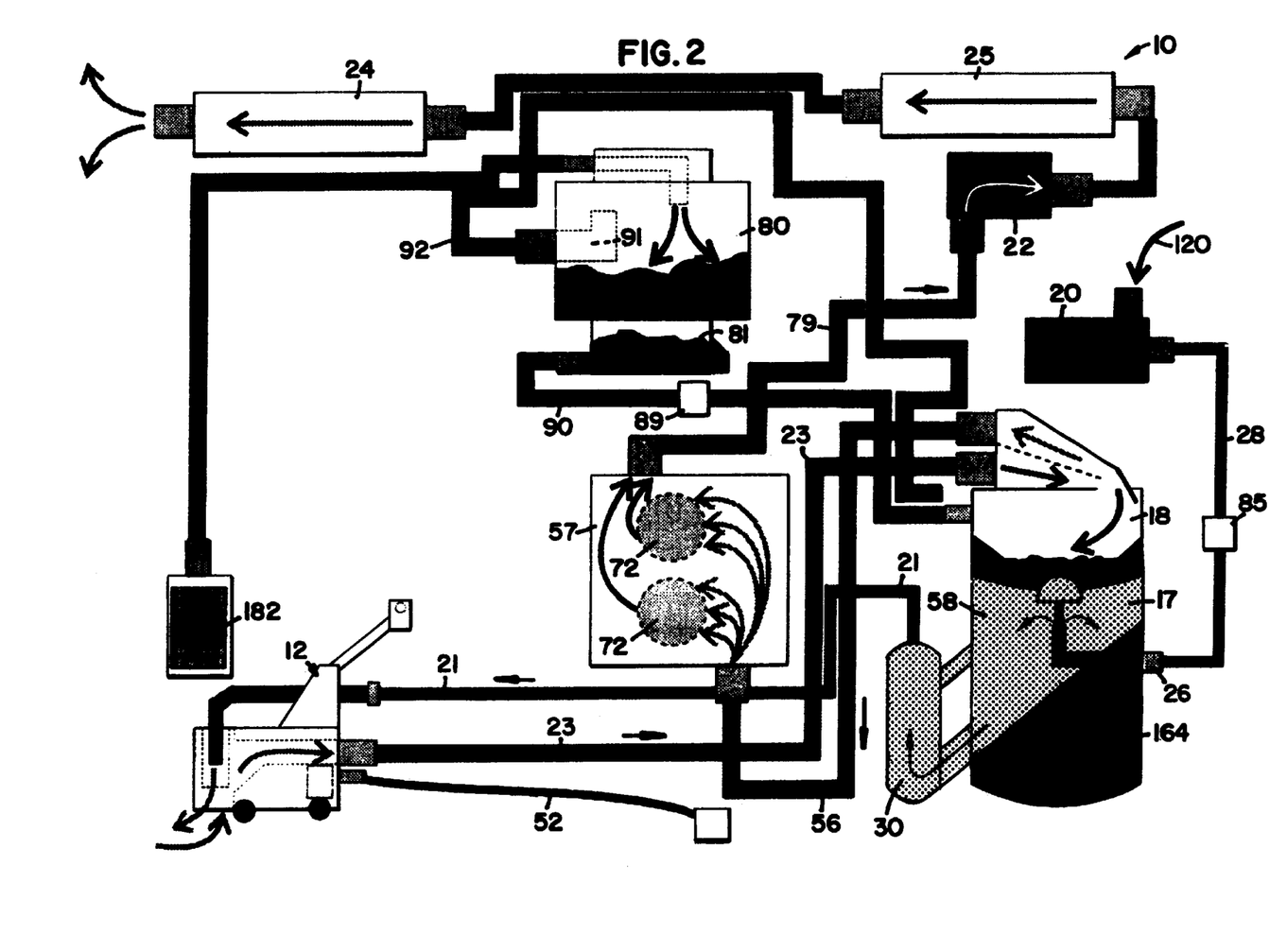
FIG. 2 is a schematic view of the system's flow lines.

FIG. 2 schematically illustrates the various components of the system 10. As shown in FIG. 2, compressed air is provided by a compressor 20 mounted upon the truck 19. The air compressor 20 is preferably mounted beneath the truck's bed; however, the compressor 20 could be mounted at other locations on the truck or could be entirely separate from the truck. The compressor 20 is a source of compressed air, which develops approximately 125 psig air. The compressor 20 is adjustable to the desired level of air pressure. It is necessary for the air pressure at the cleaning head 12 to be approximately 60 psi.

A vacuum/blower 22 creates suction to facilitate the floor cleaning process. The vacuum/blower 22 facilitates withdrawal and recovery from the floor 11 of the spent abrasive particles, dust, soil and floor particles. The vacuum/blower 22 is preferably mounted on the truck bed 19. The vacuum/blower 22 is of the positive displacement type, and is in fluid communication with the cleaning head 12. The vacuum/blower 22 is a type of vacuum pump which provides a relatively high flow rate. In the preferred embodiment, the vacuum/blower 22 is belt driven by the power-takeoff shaft of the truck 19.

The compressor 20 and the vacuum/blower 22 are both driven by the same power-takeoff shaft of the truck, so that increased air pressure provided by the compressor 20 automatically results in an increased vacuum in the vacuum/blower 22. This synchronization of the compressor and vacuum could also be accomplished by using separate power sources and an electronic control system. Alternatively, the compressed air may be provided by a compressor at the work site, coupled with an appropriate synchronization system for the vacuum and the pressurized air. For example, some hotels have an internal supply of compressed air for their laundry facilities. Depending upon the type of floor surface 11, the type of media, and the amount of soil, the air pressure may be adjusted in the 30–80 psig range.

The arrow 120 in FIG. 2 illustrates the air coming into the compressor 20. An air conduit 28 extends between the compressor 20 and the blast tank 58. A media hose 21 extends between the blast tank 58 and the cleaning head 12.

The media hose 21 is wound on a reel 27 on the truck, and the media hose 21 is approximately one inch in diameter.

An exhaust hose 23, containing a media and dust mixture, extends between the cleaning head 12 and the classifier 18. A second exhaust hose 56, containing dust and media which cannot be recycled, extends between the classifier 18 and the dust collector 57. A third exhaust hose 79 extends between the dust collector 57 and the vacuum/blower 22. The exhaust hoses 23, 56 and 79 are flexible hoses of approximately four inches in diameter. The hose 23 is mounted upon a reel 87 on the truck 19.

The vacuum/blower 22 is associated with a silencer 25 and a muffler 24 for the reduction of noise. The silencer 25 reduces the noise level of the blower exhaust, and the muffler 24 further serves to reduce the noise of the silencer exhaust. In addition, the walls of the truck preferably have noise reduction panels.

The air is delivered through conduit 28 from the compressor 20 to a water separator 26. The water separator 26 removes moisture from the compressed air. A hose (not shown) extends below the water separator 26 to the ground beneath the truck 19 to allow drainage of water from the water separator 26. The system also features an aftercooler 85 to remove moisture in the air inlet line 28 extending from the air compressor 20. The system may also have a coalescing filter to remove molecules of oil and water from the compressed air. A moisture reduction means (such as an aftercooler with a water separator and/or coalescing filter) is desirable, because the dry air helps to maintain the fineness and separation of the abrasive particles in the fluid stream. This minimizes problems with sticking and clogging in the system.

The Pressure Tank

Figure 4:
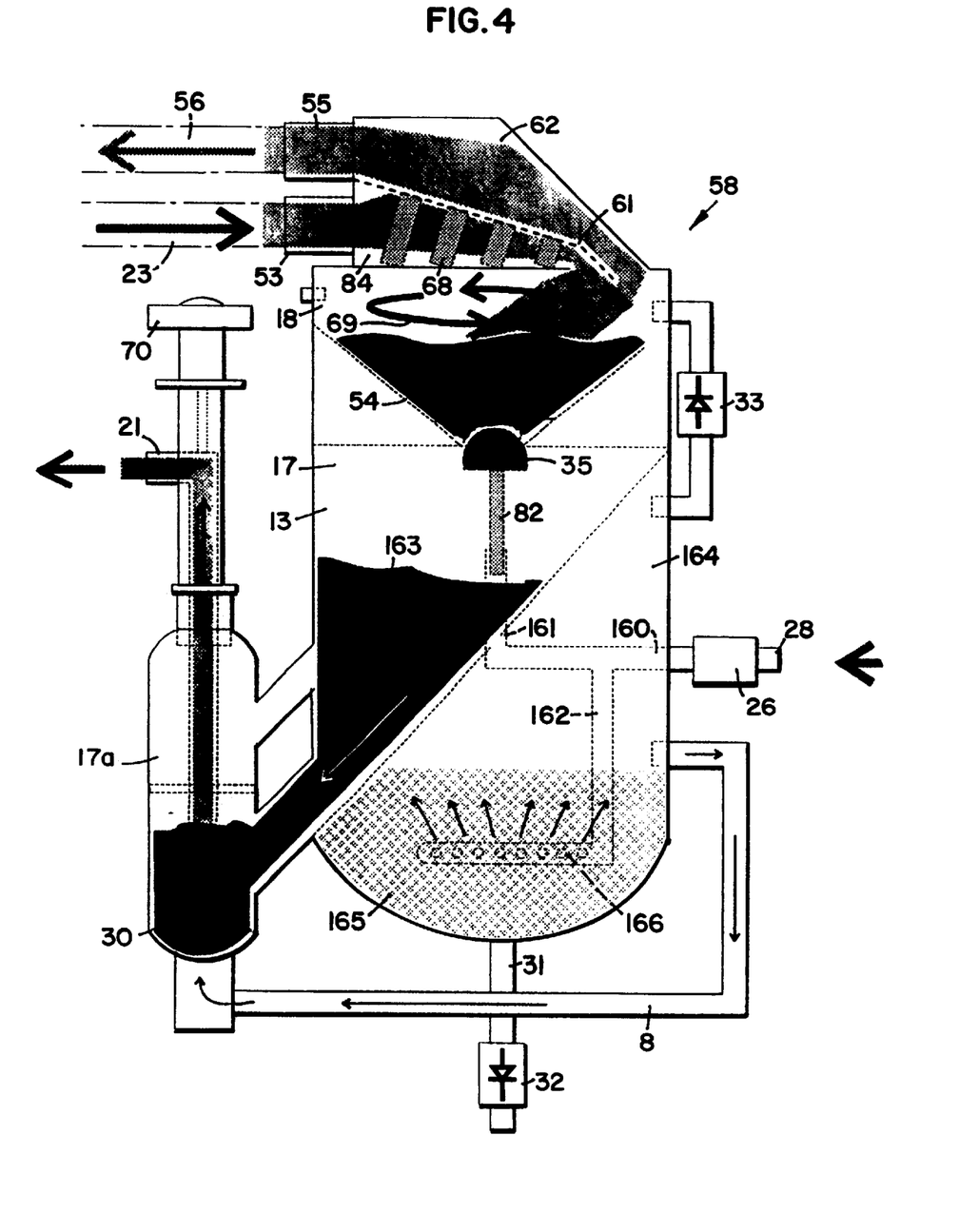
FIG. 4 is a side elevational, schematic view of the combination classifier and pressure tank of the floor restoration system.

At the blast tank 58, the media is pressurized and forced out of the pressure tank 17 to the cleaning head 12. A pressure equalizer valve 33 ensures that an equal pressure is maintained between the pressure in the blast tank's drying chamber 164 and the pressure in the classifier 18. As shown in FIG. 4, the air from the inlet line 28 passes into the pressure tank 17 through the tank's side wall. The air inlet line 28 has an inlet valve (not shown). The pressure tank inlet line 160 splits into an upwardly directed line 161 and a downwardly directed line 162, as shown in FIG. 4. The particulate matter 163 is stored in the media chamber 13 of the blast tank 58 until it is used. The lower portion of the pressure tank 18 is a compressed air drying chamber 164 which contains a deliquescent or desiccant 165. In the preferred embodiment, the deliquescent 165 is a commercially available pellet product manufactured by Van Air Systems Inc. of Lake City, Pa. The deliquescent 165 removes droplets of water from the compressed air. The desiccant tablets 165 surround an air manifold 166. The air passes through apertures in the manifold 166, as depicted by the arrows in FIG. 4. A free water drain 31, having a valve 32, extends downwardly for drainage of moisture from the blast tank 58.

An air outlet line 8 extends from the compressed air drying chamber 164 to the media aspiration vessel 17a. In the pressure vessel 17, the media is entrained into the compressed dry air and becomes fluidized in the air. The dry air flows horizontally through the exit conduit 8, then flows upwardly through a media flow regulator 30, which regulates the amount of media delivered to the cleaning head 12. The media/air mixture then passes through the flexible conduit 21 to the cleaning head 12.

Figures 11, 12:
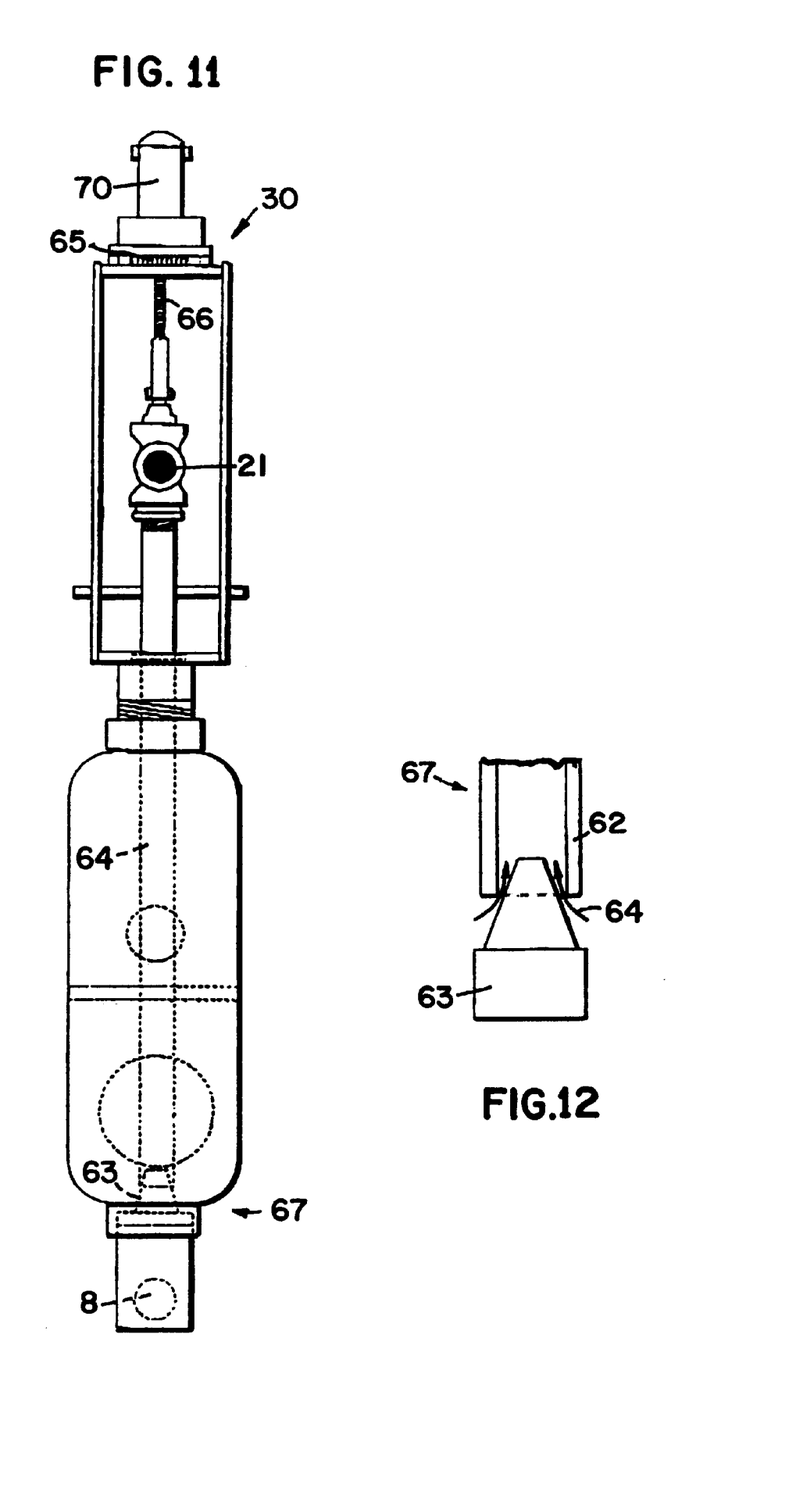
FIG. 11 is a front elevational view of the media metering assembly.
FIG. 12 is an enlarged, cutaway view of a portion of the media metering assembly shown in FIG. 11.

As illustrated in FIGS. 11 and 12, the media flow regulator 30 has a conical orifice metering assembly 67 or media metering valve to control the amount of media which enters the air stream. Preferably, the media metering valve 67 is a needle valve. The compressed air flows upwardly through the nozzle 63 of the needle valve. The media is entrained into the air jet, as illustrated by the arrow 64 of FIG. 12. The amount of the media entrained is adjustable by raising or lowering the valve seat 62 relative to the fixed nozzle 63, in order to open or close the gap through which the media flows. The needle valve seat 62 is attached to a vertical pipe 167, which can be raised or lowered by a motor 70, which is operable via gears 65 and a threaded connector 66. Alternatively, the metering assembly 67 may be controlled by a knob (not shown) which would allow for manual adjustment of the amount of media entrained. In addition, other types of media metering assemblies could be devised.

Media Transfer from the Classifier

The pressure tank's media chamber 13 is periodically replenished by the transfer of media 163 from the classifier 18. The transfer process is controlled by the position of a plunger valve 82. The plunger valve 82 is closed during normal operation. That is, the plunger 82 is in its upper position, such that the plunger head 35 abuts against its valve seat, as shown in FIG. 4. The plunger valve 82 is preferably a plug valve, which is operated by spring cams (not shown) which plug and unplug the opening by axial motion. When the plunger valve 82 descends, the media 163 in the classifier 18 falls by gravity into the media chamber 13. Whenever the cleaning head 12 is turned off, the plunger 82 falls automatically to its lower position. During operation of the cleaning system, the plunger 82 is held up in its upper position by the air flow from the conduit 161.

A vibrator (not shown) is preferably mounted on the outer wall of the blast tank 58. The vibrator prevents clogging and facilitates the flow of the media. The pressure tank 17 has one or more access doors (not shown) for the purpose of cleaning the pressure tank 17 when necessary. In the preferred embodiment, the entire top portion of the blast tank 58 is hingedly attached to the rest of the structure. When media needs to be added to the pressure tank 17 manually, or when the pressure tank 17 or classifier 18 need to be cleaned, then the top of the blast tank 58 can be easily opened. The pressure tank 17 may have a glass sight plug (not shown) which enables the operator to observe the media 163 within the pressure tank 17 and/or classifier 18.

The Cleaning Head

Figure 3:
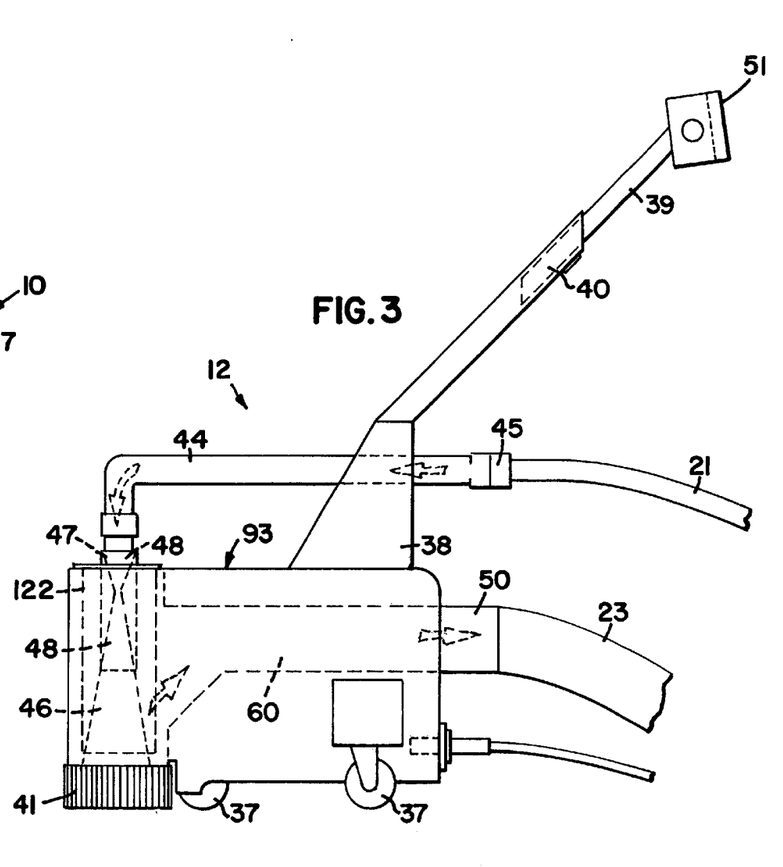
FIG. 3 is a side, schematic view of the system's cleaning head.

The cleaning head 12 is illustrated in detail in FIG. 3. The cleaning head 12 is an abrasion means by which the particulate matter is impinged upon the floor 11 to clean the floor and increase its slip resistance. The cleaning head 12 has a set of swivel wheels 37 to facilitate maneuverability and to allow the cleaning head 12 to move in any direction, including forward and backward. A support frame 38 carries the elements of the cleaning head 12. The height of the main body 93 of the cleaning head 12 is approximately ten inches from the floor, which allows the cleaning head 12 to move freely beneath sinks and tables.

The frame 38 has a handle member 39 with a height adjustment mechanism 40. At its bottom end, the cleaning head 12 has an annular floor brush 41. Preferably, the floor brush 41 is approximately six inches in diameter. In the preferred embodiment, the cleaning head 12 treats approximately a six inch path of floor with each pass. Typical floor tiles have a width of approximately six to seven inches, so the cleaning head 12 covers the entire tile in approximately a single pass. With the cleaning head's design, the edges of the treated area are "feathered," so that there is less treatment on the edges and the edges do not become subjected to excessive etching, which can cause shadows on the floor. The annular brush 41 makes firm contact with the floor 11 to be abraded, confines the spent particles, and facilitates evacuation of the particles from the floor 11.

The media hose 21 from the blast tank 58 attaches to port 44 on the cleaning head 12 by means of a suitable connector 45. The air/media inlet line 44 is in fluid communication with a vertical bazooka nozzle 48. Preferably, the nozzle 48 has an upper, converging bore portion 47 and a lower, diverging bore portion 46. The nozzle 48 is preferably screwed into position on the cleaning head 12. When the air passes through the converging portion 47 of the bore, it is discharged at increased velocity, thereby allowing the particle stream to be directed toward the floor surface 11 at high velocity. Although the present invention contemplates the use of a human operator to direct the cleaning head 12, it would be possible to have the position of the cleaning unit 12 controlled by laser coordinates, so that no operator would be needed.

In the preferred embodiment, the cleaning head 12 has a cylindrical wear tube 122. The wear tube 122 is preferably made of steel, but could be made of a high-strength polymer, carbide, or stainless steel. The tube 122 preferably has removable attachment means, such as screw threads. Alternatively, the wear tube 122 could be connected by means of welding, a clamp, or a quick-connection mechanism.

The fluidized particles impinge the surface 11 to be abraded at high velocity. This abrasion effectively removes soil, grease, wax buildup, surface materials and a microscopic layer from the floor surface 11. (These materials are referred to as "soils" below). The spent media particles and soils are then evacuated from the floor 11 into a channel 60, which carries away the media and dust mixture. The exhaust channel 60 has an outlet port 50 which is interconnected to the exhaust hose 23, which extends to the classifier 18.

On the handle 39 of the cleaning head 12 is a control panel 51. The control panel 51 has a switch for turning on and off the media blast. The control panel has another switch for turning the transfer system on and off, i.e., to transfer media from the media reservoir 81 to the pressure tank reservoir 13, as will be described below. The cleaning head 12 also has controls for the hose reels 27, 87 for the air supply hose 21 and exhaust hose 23. Preferably, the control panel allows the operator to adjust the amount of media which is entrained into the air, i.e., the operation of the metering assembly motor 70 is controlled by the operator from the cleaning head 12. The controls on the cleaning head 12 are powered by a twelve volt battery, preferably by the truck battery, via cord 52. However, it is possible to power the controls with an alternative power source.

The Classifier

In the preferred embodiment, the classifier 18 forms the upper portion of the blast tank 58, so that the classifier 18 and pressure tank 17 are combined in a single structure, rather than two separate tanks. The classifier 18 separates the heavy media particulates from the lightweight, small particulate media and from the soils. The heavy particulates are suitable for reuse, and the other materials are disposed of. Alternatively, the system 10 could have no classifier. That is, none of the media would be recycled; all of the media would simply be disposed of after one cycle. In our experience, approximately two-thirds of the media is recovered after the initial feed.

During operation of the system, the plunger 82 prevents particulate media 163 from dropping by gravity to the bottom of the media storage chamber 13. The bottom portion 54 of the classifier 18 is a trough-shaped chamber 54 having sloped walls, which is where the reclaimed media accumulates until it is transferred to the pressure tank 17.

Figure 8:
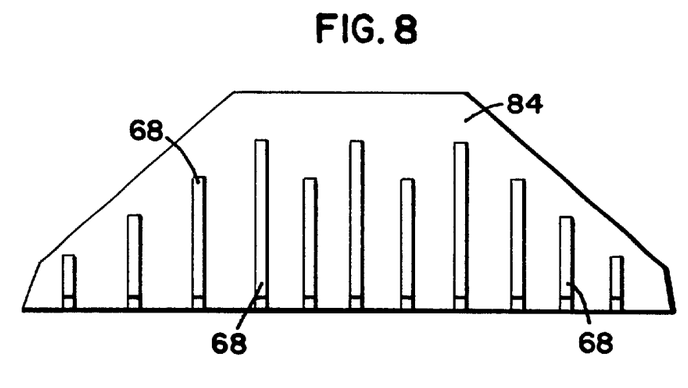
FIG. 8 is a side elevational view of the dispersion bars of the present invention.
Figure 9:
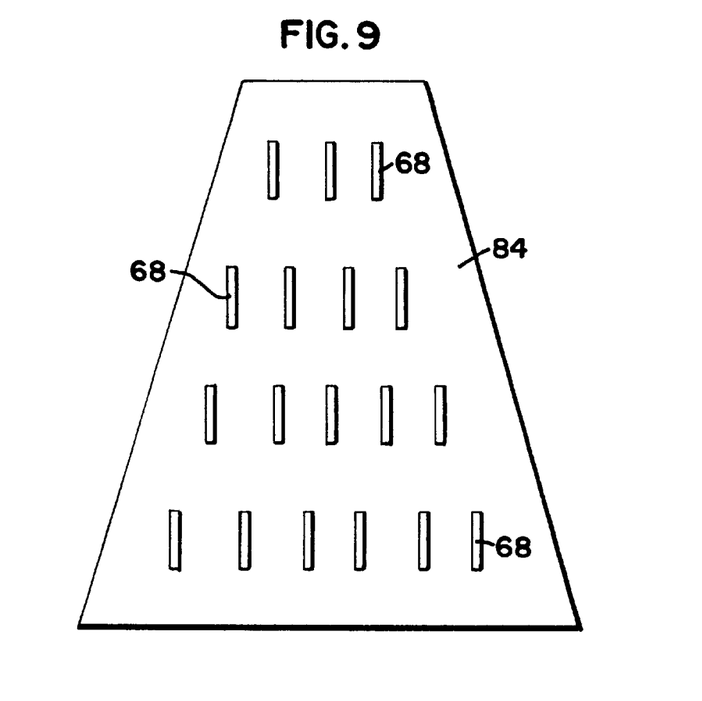
FIG. 9 is a top plan view of the dispersion bars illustrated in FIG. 8.

The classifier 18 has a port 53 which attaches to the exhaust hose 23 extending from the cleaning head 12. The exhaust hose 23 terminates in a channel 84 at the upper portion of the classifier 18. The channel 84 has a series of dispersion bars 68. In the preferred embodiment, there are a total of four rows of dispersion bars 68, as illustrated in FIG. 9. The dispersion bars 68 are preferably angled somewhat from vertical and the dispersion bars are of varying height, as illustrated in FIG. 8. The bottom floor of the channel 84 is substantially horizontal, whereas the top wall of the channel 84 slopes downwardly, as illustrated in FIG. 4.

At the terminal end of channel 84 is a sloped backup plate 61. In the preferred embodiment, the backup plate 61 is angled at approximately 120° from horizontal. The media and soils flow horizontally through the channel 84 and strike the backup plate 61. The heavier material then drops into the classifier chamber 54. The dust, soils and lighter media particles are pulled around plate 61 and through exit section 62 and exit port 55, then out of the classifier 18 to the dust collector 57. A conduit 56 extends between the classifier 18 and the dust collector 57.

The dispersion bars 68 break up the single flow stream into many small streams. These streams must then move through an abrupt 120° angle in order to continue movement toward the suction source. The lighter particles turn to follow the suction, and the larger, heavier particles (which are unable to make the abrupt change of direction) are deflected off the backup plate 61 and into the bottom of the classifier 18.

In the preferred embodiment, the classifier 18 has one or more fresh air bleed pipes (not shown). With this design, fresh air is bled into the collecting media 163 in the bottom of the classifier 18, which serves to "fluff up" any dust at the bottom of the classifier 18, thereby allowing the dust and lighter particles to be entrained into the air and drawn back to the dust collector 57.

As the air and recyclable media moves downward in the classifier 18, the classifier 18 directs the media along its outside walls, as shown by the arrow 69 in FIG. 4. As such, the classifier 18 acts like a cyclone separator to separate the heavy media particles which are suitable for re-use from the dust and lighter particles which must be disposed of. The cyclone action at the top of the classifier 18 is caused by the sharp turn in the air flow proximate the backup plate 61.

It is possible to adjust the amount of particulate media which is recovered for re-use by varying the position of certain components of the classifier 18, such as the position of the backup plate 61. This adjustment may be desired for different types of media and different types of surfaces to be treated. In the preferred embodiment, the vertical and horizontal position of the backup plate 61 can be varied by means of a screw arrangement (not shown). However, in the preferred embodiment, the backup plate 61 and other classifier components are in a permanently fixed position.

A screen (not shown) of approximately six inches in diameter, with three sixteenth inch perforations, extends across the upper portion of the classifier 18. This screen removes larger objects such as cigarette butts and chunks of glass from the media stream.

The Dust Collector

Figure 5A:
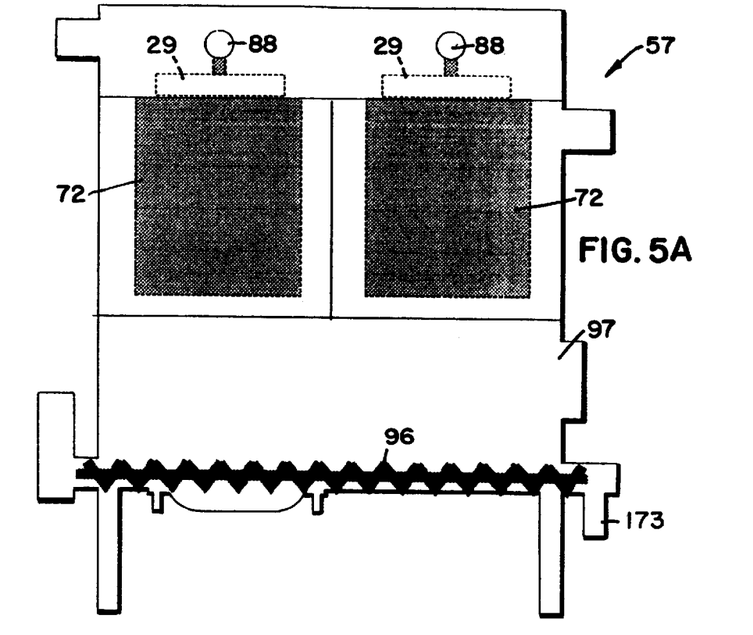
FIGS. 5A and 5B are side, schematic views of the dust collector.
Figure 5B:
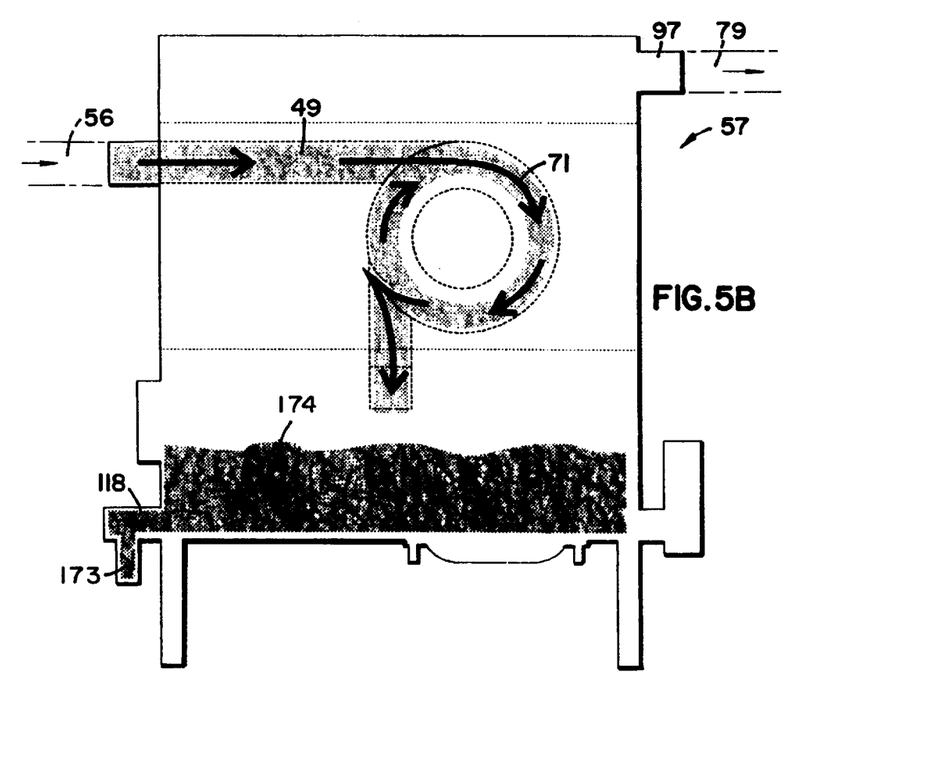

The dust collector or filter means 57 is illustrated in FIGS. 2, 5A and 5B. The fluidized materials first pass through a cyclonic pre-filter 71, after which the fluidized materials pass through a pair of air filter elements 72. The cyclonic pre-filter 71 is a metal conduit formed in a circular shape. The cyclonic pre-filter 71 may be positioned at one end of the dust collector cabinet, or in an upper portion of the dust collector cabinet. Preferably the outside diameter of the cyclonic pre-filter 71 is approximately fourteen inches, with the inside diameter of the pre-filter's conduit being approximately 4-½ inches. The horizontal portion 49 of the cyclonic pre-filter is approximately twenty-two inches in length and four inches in diameter. The purpose of the cyclonic pre-filter 71 is to remove relatively large objects and heavy media particles from the air stream, so that these items do not blast holes in the cellulose air filter elements 72. The cyclonic pre-filter 71 also removes a substantial amount of dust, which then falls to the bottom of the dust collector 57 by gravity.

After the soils, surface materials, and lightweight particulate matter pass through the cyclonic pre-filter 71, the soils are passed through a pair of filters 72. The soils are deposited on the outside surface of the filters 72, or the materials accumulate at the bottom of the dust collector, as illustrated in FIG. 5B. The dust collector 57 has a vacuum rating of ten inches of mercury (column).

The dust collector's filters are cylindrical in shape, and made of pleated paper material. The filter elements ay have several components, such as a coalescer element for oil removal, an interceptor element for particulate removal, and an absorber element for odor remover.

The filters 72 have an air flow rating of approximately 1200 cubic feet per minute, and a dust capacity of approximately 9500 grams. The filters 72 are made of a heavy-duty cellulose material. Both the height and outside diameter of each filter 72 is approximately fourteen inches, and the inside diameter is approximately nine and one-half inches. Each filter 72 is held in place by a top plate 29.

There are one or more access doors (not shown) in a wall of the dust collector 57 to facilitate replacement of the filters 72, and preferably there is also an access door 73 in the side wall of the truck 19 proximate the dust collector 57.

The upper portion of the dust collector 57 has two air directors 88, which permit pulses of air to be delivered through the filters 72 for cleaning. One air director 88 is positioned above each filter cartridge 72. The air directors 88 (also known as back pulse check valves) deliver air downwardly through the center of each filter 72 in intervals so as to remove accumulated soils from the filters 72. This provides an automatic, pulse jet cleaning mechanism for the dust collector 57. A slight interruption in the vacuum, operated by an appropriate control circuit, causes pulses of air to pass through the filters 72. The blasts of air emanate from the dust collector's pulse jet tank (not shown). Preferably, only one air filter 72 is pulsed at a time.

Near the upper end of the dust collector 57 is a port 97 which receives exhaust line 79, which is preferably four inches in diameter. The conduit 79 extends to the vacuum pump 22. The exit port 97 has a vacuum relief valve (not shown).

In the preferred embodiment, the bottom portion of the dust collector has side walls which converge to form a trough at the bottom of the dust collector. Proximate the bottom of the dust collector is an auger 96 which carries the soils to the outlet pipe 173. A pipe 73 directs the soils 174 out of the dust collector 57 for emptying. The soils are expelled through the pipe by a flapper valve 118. The operator attaches a hose to the outlet pipe 173, and the soils then empty into a bucket or bag for disposal. The bottom portion of the dust collector 57 has a vibrator (not shown) to facilitate movement of the soils. The dust collector 57 also has a pressure relief valve (not shown).

An alternative to the auger 96 is an air sluice (not shown), which injects air into the dust collector 57 to expel the soils. The air sluice is in fluid communication with air tubing which carries air toward the discharge chute. A manual air switch (not shown) controls this air injection mechanism.

Effect of Floor Treatment

Figure 6:
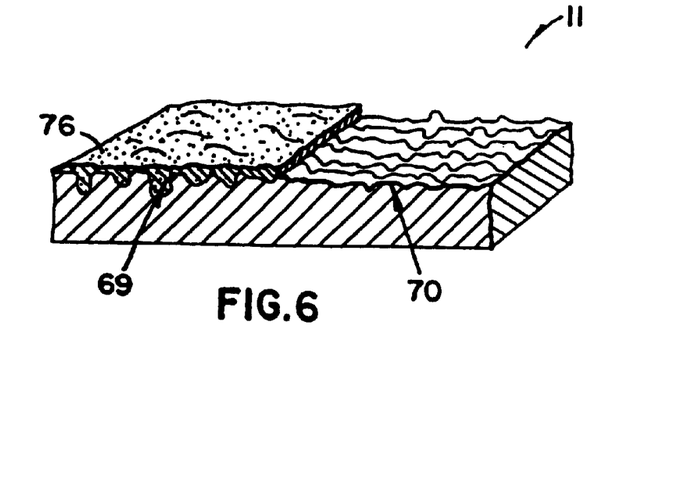
FIG. 6 is a perspective view of untreated floor tile and floor tile which has been treated with the restoration system of the present invention.

As illustrated in FIG. 6, the restoration process of the present invention removes the top layer 76 and exposes the floor's pores to the surface 70. The schematic view of FIG. 6 is exaggerated for clarity; the present invention removes approximately two to three thousandths of an inch from the floor 11. The floor's pores are shallowed, which makes cleaning and drying more efficient and effective. The soils, grease, excess cleaning material, dust, etc., designated in FIG. 6 as 69, are also removed. The right side of FIG. 6 illustrates the composition of the floor 11 after the restoration process of the present invention. The surface 70 of the floor has small peaks and valleys which are free from soil. The floor surface 70 provides excellent slip resistance. Besides providing a clean and slip-resistant floor surface, the present invention may also be used to etch a floor surface to provide a bonding tooth for a subsequent surface coating. When used in this patent application, the terms "etching" and "abrasion" do not imply any damage or visible design on the floor's surface; rather, these terms are used to describe the removal of the soils, etc., as described above.

The preferred media consists of garnet particles, which is an aluminosilicate mineral. The preferred size range of the garnet particles is 0.1 to 0.8 mm. Alternative types of suitable media include silicon carbide, silica sand, and any other suitable homogeneous, inert minerals. Somewhat softer suitable types of media include walnut shells, corn cobs, baking soda, glass beads, plastic beads, and copper slags. The size and hardness of the media is selected to match the hardness of the surface to be treated and the goal of the treatment. For example, if the goal is to clean the floor, then a relatively soft grit would be selected. If the goal is to significantly increase the floor's coefficient of friction, then a relatively small, hard type of media would be selected. If the surface being treated is thin (such as a pan) or soft (such as asphalt) then a relatively soft media material would be used.

Media Storage and Transfer System

Figure 7:
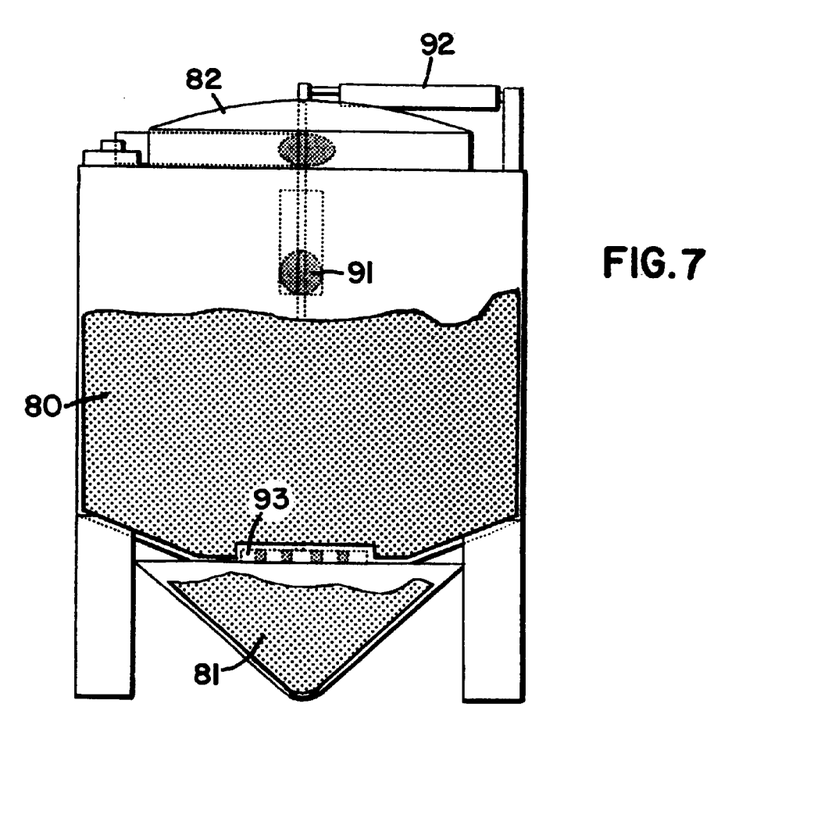
FIG. 7 is a side, schematic view of the media hopper.

As shown in FIGS. 7, 2 and 10, the truck 19 has media storage means, i.e., a bulk media hopper 80. The truck also has a smaller, reserve media hopper 81 which is equal in capacity to the volume of the pressure tank's media chamber 13. When the cleaning process is not operating, the operator may flip a switch on the cleaning head's central panel in order to transfer media from the reserve hopper 81 to the pressure tank's media tank 13. The media is drawn into the blast tank 58 by means of a vacuum. It takes approximately 40 seconds for the media to pass from the reserve hopper 81 to the pressure tank 17. Alternatively, the system could pulse media on a continuous basis from the reserve hopper 81 to the pressure tank 17. The bulk of the media is held in the large hopper 80 until the transfer switch is turned off. When the transfer switch is turned off, the reserve hopper 81 is allowed to fill.

Preferably, the operator adds media through door 182 in the floor of the trailer, which is above the large holding tank 80. From door 182 the media passes through conduit 92 and through inlet 91 into tank 80. A chamber 80 has sufficient capacity to permit the system to run for a substantial period of time. It takes approximately 10 minutes to transfer the media from door 182 through conduit 92 and inlet 91 into the tank 80.

In the preferred embodiment, the initial charge of media in the pressure tank chamber 13 is approximately 200 pounds. Depending upon the size of the area 11 to be cleaned, additional media may need to be added to the pressure tank 17 during the cleaning operation in order to compensate for the media that is not recycled and recovered.

A pinch valve 89 in the conduit 90 (between the reserve media tank 81 and the pressure tank 17) remains closed during operation of the cleaning system 10 in order to prevent vacuum loss. The pinch valve 89 is opened during transfer of media from the reserve hopper 81 to the pressure tank 17. In the event that the pressure tank 17 is not permanently mounted to the truck, and is instead mobile on a cart, then the media transfer mechanism described above would not be used. Instead, the top of the pressure tank 17 would be opened in order to allow the media to be filled manually.

As shown in FIG. 7, the reserve the tank 81 is located directly below the main tank 80, so that the media can fall through the grate 93 by gravity. Media is introduced into tank 80 through conduit 92 and inlet 91. After the reserve tank 81 is filled from tank 80 through grate 93, the grate 93 is closed, and the grate 93 remains closed during transfer of the media from the reserve hopper 81 to the pressure tank 18.

The restoration process of the present invention is only one step in an ongoing floor maintenance program. Preferably, the quarry tile floor is restored with the invention's system every one to three years. Routine daily cleaning with proper floor cleaning procedures and chemicals (the preferred routine being to sweep, apply detergent, deck brush, and rinse) are required to maintain the optimum coefficient of friction.

Although the present invention has been described for restoration of a floor, specifically a quarry tile floor, the present invention could be used for many other types of surfaces. For example, the present invention may be utilized on concrete (pool decks, buildings, roadways, walkways, etc.); stainless steel (storage tanks, hood and ducts, etc.); asphalt (driveways, roads, etc.); and other surfaces and applications. The system may be used to remove rust, provide a thorough cleaning, and/or increase the surface's coefficient of friction. Because the invention is a closed system which contains the stream of particles, the invention may be utilized both indoors and outdoors.

Operation of the Invention

The operation of the cleaning and restoration system 10 will now be described. The truck 19 is positioned close to the work site. The cleaning head 12 is positioned upon the surface 11 to be treated. The blast tank's pressure valve is opened, and the drain valve 32 on the pressure tank 17 is also opened.

The pressure tank 17 is loaded with the particulate media from the storage tanks 80, 81. An appropriate type and size of media is selected, depending upon the type of surface being treated and the goal of the treatment. For floor areas under approximately 1,000 square feet, approximately 200 pounds of media should be charged in the pressure tank 17. The vibrator (not shown) on the blast tank 58 is engaged.

The exhaust conduit 23 from the cleaning head 12 to the classifier 18 is connected. The dust collector 57 and aftercooler 85 require a 110 volt power source. This electrical connection is made from the job site's "house" outlet with an extension cord.

Before the system 10 is activated, the rear and side doors of the truck trailer are closed to reduce noise. The truck 19 is started, with the emergency brake on and the truck out of gear. A power cord 52 extending between the cleaning head's control panel and the truck 19 is attached so that the truck's battery can power the switches on the cleaning head 12. To start the system, the truck's engine is started and the operator turns the key switch to the "start" position. The vacuum/blower 22 is started by engaging the PTO clutch via a belt and activating a vacuum/blower knob in the truck's cab. The compressor 20 is also started by engaging the PTO and activating a compressor knob (not shown) in the truck's cab.

The media metering system 30 for the pressure tank 17 is adjusted to regulate the amount of abrasive particles which are entrained in the air stream and delivered to the cleaning unit 12. The needle valve's setting may need to be adjusted throughout the cleaning process of the floor 11, because the withdrawal of grease, debris and moisture from the floor 11 may affect the flow rate of the particulate media. Additionally, the air pressure may need to be increased or decreased in the 40–60 psig range.

The blasting action is turned on with the "on/off" switch on the cleaning head's control panel. This activates the vacuum recovery system and begins movement of the particulate media to the floor area 11. The cleaning head 12 is moved slowly back and forth across the floor surface 11 to give the level of cleansing and restoration desired. The treated floor 11 will have a slightly dull appearance free of grease, oils and debris. The treated floor 11 will exhibit an increased coefficient of friction. The cleaning head 12 should not be allowed to remain in one area too long or move too slowly, because excessive erosion of the floor 11 may occur. As the media is transferred from the pressure tank 17 and vacuumed up, portions of the media are accumulated in the classifier tank 54 from which it can be reused.

If a large floor area 11 is being treated, for example in excess of 1500 square feet, the operator may need to add additional particulate media to the pressure tank 17, due to the loss of some particulate media in the vacuum recovery system. After about three transfer sequences, there may be an insignificant amount of recyclable media remaining. Large floor areas may also require draining of the particulate media and the substitution of new media if the media becomes heavily laden with grease, oil and/or moisture.

In order to shut down the system, the blast switch on the cleaning head 12 is turned to its "off" position. To stop the vacuum/blower 22 and compressor 20, the PTO clutch is disengaged. The vacuum pump 22 is disengaged by pushing in the clutch and depressing the vacuum pump engagement knob (not shown). The clutch is released, and the compressor 20 is allowed to continue running long enough to clean the dust collector filters 72. The air directors 82 are activated to clean the filter elements 72. The chute cover (not shown) of the dust collector 57 is opened, and a dust bag is placed over the end of the chute 118. The dust collector is emptied with the auger 96, and the cleaning head 12 and cart (not shown) are returned to the truck 19.

Any loose media upon the floor 11 is swept up and disposed of. The treated floor 11 is then rinsed to remove any residual dust or material left on the floor. The classifier 18 is drained by transferring media into the pressure tank 17. The pressure tank 17 and dust collector are then drained of media and soils, which are disposed of.

EXPERIMENTAL SECTION

X-ray microanalysis tests were conducted to determine the elements present in quarry tile. A new, untreated quarry tile was tested, as well as quarry tile treated by an acid etch process and a quarry tile treated with the cleaning and restoration process of the present invention. The first three columns show the composition of the tile's surface, whereas the right-hand column shows the composition of the core of a new, untreated tile. The type of quarry tile tested is sold by the American Olean Co. under the trademark Canyon Red™. The acid etch product was of the type manufactured by the Economics in Technology/Carroll Co. of Costa Mesa, Calif. under the Ultra Traxion™ trademark. The below figures show the percent by weight of each element. The figures have been rounded off, resulting in slight variations from 100 percent. The elemental analysis results are shown in Table I.

TABLE I

ELEMENTAL ANALYSIS

| Element | Untreated Tile | Acid Etched Tile | Restored Tile | Core |
|---|---|---|---|---|
| Silicon | 51 | 39 | 51 | 51 |
| Aluminum | 32 | 29 | 22 | 23 |
| Sodium | 6 | — | 2 | 2 |
| Potassium | 5 | 3 | 6 | 7 |
| Manganese | 4 | 3 | 3 | 2 |
| Calcium | 2 | 4 | 2 | 2 |
| Iron | 1 | 20 | 12 | 12 |
| Titanium | — | 2 | 1 | 1 |
| | 101 | 100 | 99 | 100 |

(The above percentages do not include oxygen)

These data show that the acid etch treatment significantly reduces the amount of hard particles (silicon) in the quarry tile, by reducing them from 51% to 39% of the tiles composition. In contrast, the restoration system of the present invention maintains the amount of hard particles at about 50%, thereby maintaining the integrity and durability of the tile surface. The tile treated with the restoration system exhibited an elemental composition substantially the same as the core of new, untreated quarry tile. Therefore, the restoration system does not appear to reduce the life expectancy of the tile.

We have found that the aluminum content of the surface of untreated tile floors ranges from about 19 wt % to about 32 wt % while the tile core has an aluminum content of about 17 wt % to about 25 wt %. The silicon content of the tile floors ranges from about 50 to about 59 wt % at the surface of an untreated tile floor to about 51 to about 66 wt % at the core.

The coefficient of friction (COF) measures how well a shoe resists slipping on a floor. A high number is slip resistant; a low number is slippery. Although there is no current ANSI (American National Standard Institute) requirement, a minimum coefficient of friction of 0.50 (wet and dry) is a recognized industry standard for a slip resistant flooring surface. The Ceramic Tile Institute and the National Bureau of Standards consider coefficient of friction values in excess of 0.60 as safe values, from 0.50 to 0.60 as marginally or condition ally safe, and values below 0.50 as slippery. New tile typically has a COF of 0.8–0.9 when clean and dry; 0.4–0.5 when wet; and 0.2–0.3 when soiled and wet. Old tile typically has a COF of 0.5–0.6 when clean and dry; 0.2–0.3 when wet; and 0.1 when soiled and wet.

Experiments where conducted to measure the slip resistance or coefficient of friction (COF) of tile floors. The COF was measured by using a Brungraber Mark II™ slip tester machine. Measurements were taken of new quarry tile, old untreated quarry tile, and old quarry tile which had been treated with the abrasion system of the present invention. The "new" tile was in use in a restaurant setting, but had been installed only months before the testing. Measurements were taken under the following floor conditions: 1) clean and dry, 2) wet, and 3) soiled and wet. The COF measurements are summarized in Table II.

TABLE II

COEFFICIENT OF FRICTION

|  | New Tile | Old, Untreated Tile | Old, Treated Tile |
|---|---|---|---|
| Clean/Dry | 0.8–0.9 | 0.4–0.6 | 0.8–0.9 |
| Wet | 0.4–0.5 | 0.2–0.3 | 0.5–0.6 |
| Soiled/Wet | 0.2–0.3 | 0.1 | 0.3–0.4 |

These data show that the present invention produces a floor surface that is comparable to new quarry tile when the floor is clean and dry. When the floor is wet, or soiled and wet, the system of the present invention actually increases the COF and traction of the floor as compared to a new tile.

As noted above, it is possible to use different types and sizes of media in order to achieve the desired floor surface which is cleaner and/or has increased traction. Experiments were conducted to measure the coefficient of friction of quarry tile floors with respect to the effect of varying air pressures and varying sizes of the media. Measurements were taken of brand new, unused, dry tile which had been treated with the restoration system of the present invention, as well as brand new tile which had been subjected to a coating of oil and water after treatment by the restoration system. These respective COF measurements are summarized in Tables III and IV respectively. The type of media utilized for these experiments was garnet.

TABLE III

EFFECT OF GRIT SIZE AND PRESSURE ON COEFFICIENT OF FRICTION (DRY FLOOR)

|  |  | Pressure (psi) | | | |
|---|---|---|---|---|---|
|  |  | 40 | 50 | 60 | 70 |
| Grit | 0.5–0.65 | 0.92 | 0.94 | 0.95 | 0.94 |
| Size | 0.32–0.38 | 0.93 | 0.95 | 1 | 1 |
| (mm) | 0.18–0.24 | 0.96 | 0.95 | 0.96 | 1.01 |

TABLE IV

EFFECT OF GRIT SIZE AND PRESSURE ON COEFFICIENT OF FRICTION (WET AND OILY FLOOR)

|  |  | Pressure (psi) | | | |
|---|---|---|---|---|---|
|  |  | 40 | 50 | 60 | 70 |
| Grit | 0.5–0.65 | 0.27 | 0.32 | 0.37 | 0.31 |
| Size | 0.32–0.38 | 0.37 | 0.41 | 0.45 | 0.46 |
| (mm) | 0.18–0.24 | 0.34 | 0.37 | 0.43 | 0.46 |

It is possible to modify the system to take additional precautions with respect to noise, such as inserting foam inside the truck's fender wells, or adding noise reduction skirting.

These data show that, generally, increased air pressure results in an increased coefficient of friction and a smaller-sized media also increases the coefficient of friction and traction of the floor.

It is to be understood that numerous and various modifications can be readily devised in accordance with the principles of the present invention by those skilled in the art without departing from the spirit and scope of the present invention. For example, in order to allow the system to operate on higher level floors than the ground floor of a building, the system could be modified so that the pressure tank and dust collector are mobile. Another modification would be to use an electric motor to run the system, rather than the PTO of the truck. The remote system could also be propane powered instead of electrically powered. Therefore, it is not desired to restrict the invention to the particular constructions illustrated and described, but to cover all modifications that can fall within the scope of the appended claims.

What is claimed is:

1. A system for cleaning a soiled surface and/or restoring the soiled surface to a slip resistant condition, the surface having soils and surface particles, the system comprising:

a) compressor means for supplying an air stream, said compressor means being adjustable to a desired level of air pressure, said compressor means being in fluid communication with an air supply conduit;

b) moisture reduction means in association with the air stream;

c) entrainment means for entraining media particulates into the air stream comprising an amount of media particles, said entrainment means being adjustable so that the amount of media particulates entrained can be varied;

d) media chamber means for storing the media particulates before entrainment in the air stream;

e) restoration means for impinging the media particulates upon the surface to remove soils and surface particles, said restoration means being movable across the surface in any direction, said restoration means being in fluid communication with an exhaust conduit, wherein said restoration means comprises:
   i) a support frame including a plurality of wheels;
   ii) a nozzle having a longitudinal bore, one end of which is proximate the surface; and
   iii) an exhaust chamber in fluid communication with said bore and with said exhaust conduit;

f) vacuum means in fluid communication with said exhaust conduit for an evacuation of substantially all of the soils and surface particles from the surface, wherein said vacuum means automatically adjusts to said level of said air stream of said compressor;

g) classifier means for separating a portion of the media particulates from the soils and surface particles, said classifier means being in fluid communication with said exhaust conduit;

h) automatic transfer means for transferring heavy media particulates from said classifier means to said media chamber means; and i) filter means for filtering the soils and surface particles, said filter means being in fluid communication with said classifier means, wherein said system etches the surface and increases the coefficient of friction of the surface.

2. The system of claim 1, wherein said transfer means includes a valve which automatically opens when said cleaning system is inactivated so as to permit the particulates to enter said media chamber means by gravity, wherein said classifier means is positioned above said media chamber means.

3. The system of claim 1, further comprising a truck having a power takeoff shaft, wherein said compressor means is powered by said truck takeoff shaft.

4. The system of claim 3, wherein said filter means comprises a dust collector.

5. The system of claim 4, wherein said dust collector includes pulse jet cleaning means.

6. The system of claim 3, wherein said vacuum means is powered by said truck takeoff shaft.

7. The system of claim 1, further comprising a drying chamber which contains a desiccant means, at least a portion of said air stream being in fluid communication with said drying chamber.

8. The system of claim 1, wherein the media particulates are selected to match the surface hardness.

9. The system of claim 1, wherein the media particulates comprise garnet.

10. The system of claim 1, wherein the media particulates are approximately 0.1 to 0.8 mm in size.

11. The system of claim 1, wherein the surface is a floor.

12. The system of claim 1, wherein said classifier means includes a plurality of dispersion bars.

13. The system of claim 1, the classifier comprising an inlet conduit for media particulate wherein a longitudinal axis of said inlet conduit of said classifier is approximately 120 degrees from a longitudinal axis of said exhaust conduit.

14. The system of claim 1, the classifier comprising an inlet conduit for media particulate wherein a terminal end of said inlet conduit of said classifier includes a deflection plate.

15. The system of claim 1, wherein said abrasion means includes a control panel for controlling operation of said system.

16. The system of claim 15, wherein said control panel includes adjustment means for varying the amount of particulates entrained in said air stream.

17. The system of claim 15, wherein said control panel includes particulate transfer means for automatically transferring the media particulates from a media hopper to said media chamber means.

18. A system of cleaning a soiled floor and restoring the soiled floor to a slip resistant condition by means of media particulates, the floor being made of relatively soft and hard components, the floor having soils and surface particles thereon, the system comprising:

a) a compressor for supplying an adjustable air supply to an air conduit;

b) a pressure tank for containing a media storage means and for entraining an effective amount of the media particulates into the air supply, said media particulates being made of garnet, wherein said media particulates impinge upon the floor to dislodge the soils and surface particles and to remove soft components of the floor;

c) moisture reduction means associated with said pressure tank, said moisture reduction means including a deliquescent;

d) a portable cleaning head movable on the floor in any direction, said cleaning head including:

i) a support frame including a plurality of wheels, said support frame including a handle;

ii) a nozzle which is in fluid communication with said air conduit;

iii) a wear tube releasably attached to a lower end of said nozzle;

iv) an exhaust chamber proximate said nozzle, said exhaust chamber being in fluid communication with an exhaust conduit;

e) vacuum means in fluid communication with said exhaust conduit for the evacuation of substantially all of the soils and surface particles from the floor;

f) classifier means for separating the media particulates from the soils and surface particles, said classifier means being located above said pressure tank, said classifier means including an inlet conduit having a plurality of dispersion bars; and g) dust collector means for filtering soils and surface particles, said dust collector means being in fluid communication with said classifier means.

19. The system of claim 18, further comprising a truck having a power takeoff shaft, wherein said compressor means is powered by said truck takeoff shaft.

20. The system of claim 19, wherein said vacuum is powered by said truck takeoff shaft.

21. The system of claim 18, where said dust collector includes pulse jet cleaning means.

22. The system of claim 18, wherein said dust collector includes a cyclonic filter.

23. The system of claim 18, wherein the media particulates are approximately 0.1 to 0.8 mm in size.

24. The system of claim 18, wherein an axis of said inlet conduit of said classifier is approximately 120 degrees from an axis of said exhaust conduit.

25. The system of claim 18, wherein one end of said inlet conduit of said classifier includes a deflection plate.

26. The system of claim 18, further comprising an automatic media transfer means for transporting the media from a storage hopper to said pressure tank.

27. The system of claim 18, further comprising a classifier transfer means for transferring the heavy particulates from said classifier means to said media storage means of said pressure tank, said classifier transfer means comprising a plunger valve means within said pressure tank, having an upper, closed position and a lower, open position, said plunger valve means permitting transfer of the media particulates by gravity when in said open position.

28. The system of claim 27, wherein said classifier transfer means is electrically interconnected to a switch on said cleaning head, such that said classifier transfer means automatically permits transfer of media particulates when said cleaning head is switched to an "off" position.

* * * * *